Figure 1:
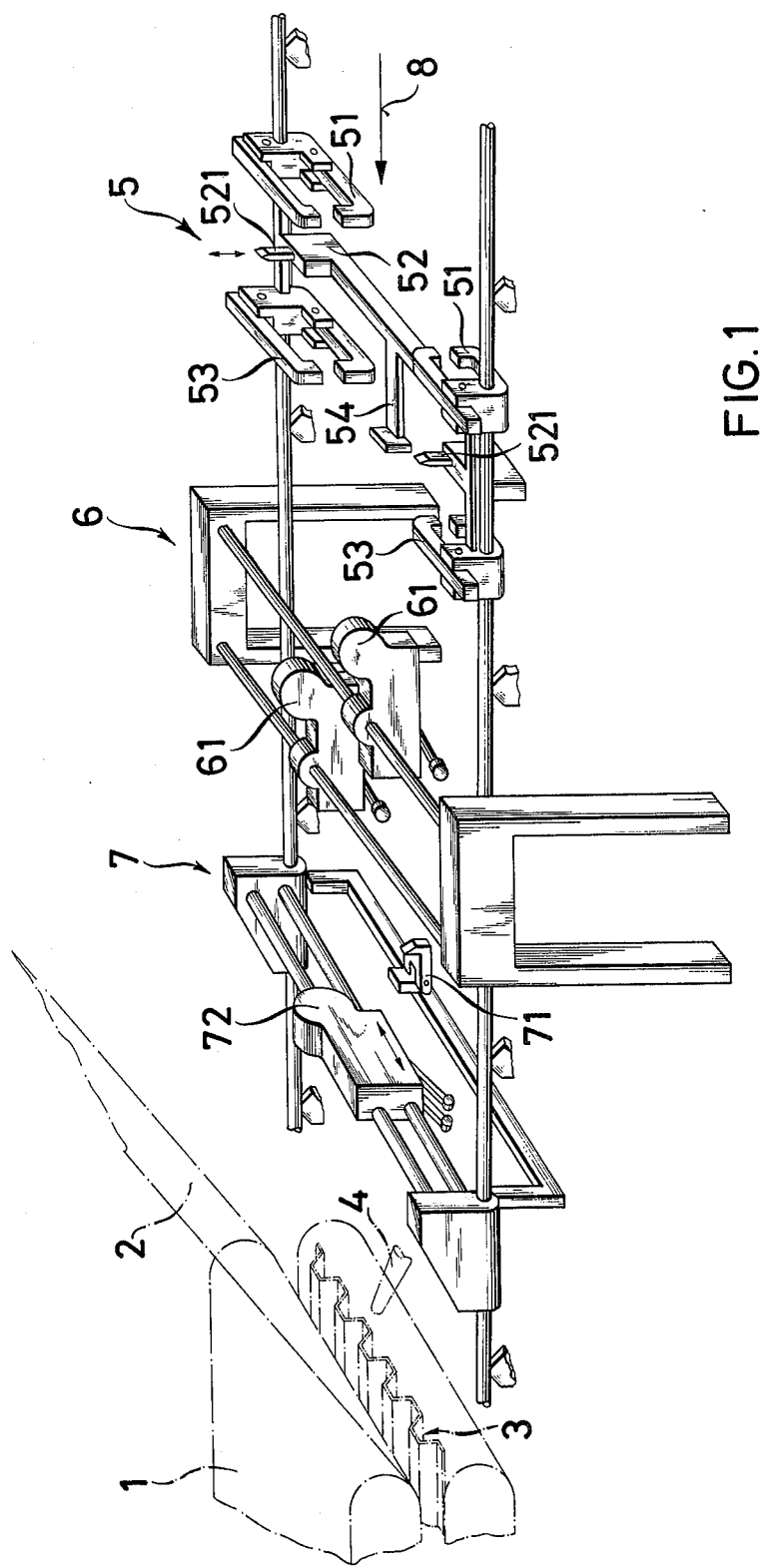

United States Patent [19]

Schmidt

[11] 4,087,310

[45] May 2, 1978

[54] DEVICE FOR INTERCONNECTING PLATES TO BE COVERED BY FOAMED MATERIAL

[75] Inventor: Horst Schmidt, Siegen, Germany

[73] Assignee: Hoesch Werke Aktiengesellschaft, Dortmund, Germany

[21] Appl. No.: 752,063

[22] Filed: Dec. 20, 1976

Related U.S. Application Data

[62] Division of Ser. No. 546,792, Feb. 3, 1975, abandoned.

[30] Foreign Application Priority Data

Feb. 1, 1974 Germany .............................. 2404723

[51] Int. Cl.² ............................................... B32B 3/22
[52] U.S. Cl. ..................................... 156/505; 156/157; 156/304; 156/556; 428/58
[58] Field of Search ............... 156/157, 304, 545, 505, 156/506, 556, 558, 566; 428/57, 58, 59, 182–186

[56] References Cited

U.S. PATENT DOCUMENTS

| | | | |
|---|---|---|---|
| 2,037,297 | 4/1936 | Yeager | 428/184 |
| 2,216,206 | 10/1940 | McKee | 428/59 |
| 2,787,396 | 4/1957 | Christensson | 156/477 R |
| 3,127,303 | 3/1964 | Neuhauser | 156/304 |
| 3,135,642 | 6/1964 | Ruffer | 156/304 |
| 3,145,131 | 8/1964 | Finke | 428/59 |
| 3,533,891 | 10/1970 | Puyear | 156/304 |
| 3,773,603 | 11/1973 | Schulander | 428/59 |
| 3,930,929 | 1/1976 | Lingl | 156/558 |
| 3,972,762 | 8/1976 | Kawahara et al. | 156/304 |

*Primary Examiner*—William A. Powell
*Assistant Examiner*—John E. Kittle
*Attorney, Agent, or Firm*—Walter Becker

[57] ABSTRACT

A device for interconnecting longitudinally profiled plates to be covered by foamed material, especially plates with a trapezoidal or corrugated profile, according to which one end of one plate and the start of the next following plate are clamped at a predetermined distance from each other and are held in clamping members forming part of one and the same carriage which is moved along a predetermined path. While the plates are thus being moved first adhesive tapes are applied to the plates across the gap between the plates in the direction of movement of the plates, and subsequently an adhesive tape is applied to the plates over the gap between the plates in a direction transverse to the first adhesive tapes.

6 Claims, 4 Drawing Figures

DEVICE FOR INTERCONNECTING PLATES TO BE COVERED BY FOAMED MATERIAL

This is a division of co-pending parent application Ser. No. 546,792—Schmidt filed Feb. 3, 1975 (Monday), now abandoned.

The present invention relates to a device for connecting longitudinally profiled plates to be covered with foamed material, especially plates provided with a trapezoidal or corrugated profile, so as to form a continuous cover layer, especially for a continuous production of compound elements.

It is known to employ a device for continuous application of synthetic foamed materials to plate-shaped supporting material while closing the abutment gaps of the supporting plates arranged one behind the other to form an endless band, by means of a glue strip or the like prior to the application of the synthetic foamed layer to the continuously transported supporting plates. The device concerns plane supporting plates which according to an important feature, prior to being connected to each other have their end faces abut each other. The heretofore known design is based on an apparatus which works in such a way that during the transport of the plate material, in the longitudinal direction a gluing machine moves at the speed of the supporting plates. This gluing machine glues together the abutment of two plates in the longitudinal direction. After the gluing operation has been completed, the gluing machine returns to its starting position. The above mentioned device has the great disadvantage that for the movement of the gluing machine parallel to the advancing direction of the supporting plates, special devices are necessary.

Furthermore a continuous manufacture of plates of hard foam provided with rigid cover layers has become known according to which the moved cover layers are formed of individual plates which abut each other and which in pairs are guided one above the other and simultaneously are laterally sealed. The gap between the plates is filled in with a foamable mixture while the abutment surfaces of the respective upper and lower plates are prior to the introduction of the foamable mixture connected to each other by tapes and are sealed. With this arrangement it is possible to place the plates from the start at a certain distance from each other onto the conveyor which placing may be effected by means of chains moving along with the plates on both sides thereof and provided with adjustable spacers.

The above mentioned design has the purpose of producing plates for certain applications with a core of foamed material projecting from below the plane cover layers. An expensive synchronization with the remaining conveying and working operations is necessary. A complete relief of the tape during the transverse taping can, however, not be realized over a longer period of operation because a precise coordination between gluing machine, conveyor and chains with spacer means in which the plates are inserted only loosely with play, would be necessary and would have to be maintained so that already for this employment with plane plates with which measuring devices of the rims are possible in one plane only will not be satisfactory with regard to a seal of the tape gaps by the tapes which do not seal along the entire length of the longitudinal rims. This heretofore known design is not suitable for a tight connection of for instance trapezoidal or corrugated sheets with which in particular due to self stresses, the face areas of the individual plates have more or less great profile differences in the horizontal and vertical plane and in most instances have also a certain curvature of the entire sheet in a horizontal plane so that the tape easily tends to form folds or overlappings bring about leakage.

It is, therefore, an object of the present invention to provide a device for connecting longitudinally profiled plates to each other, especially plates having a trapezoidal or corrugated profile, while said device will in spite of a simple continuous manufacture assure an operation safe seal or tightness of the taped abutment gaps.

These and other objects and advantages of the invention will appear more clearly from the following specification in connection with the accompanying drawings, in which:

FIG. 1 shows an overall view of the most important parts of the apparatus.

Figure 2:
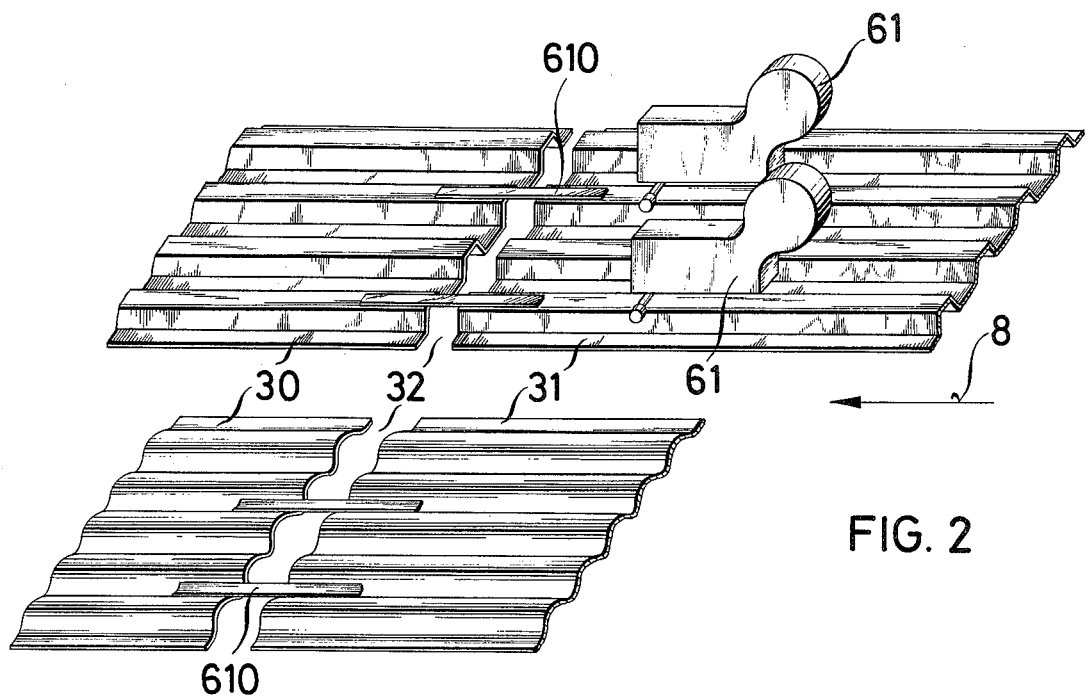

FIG. 2 diagrammatically illustrates the taping in the longitudinal direction of the plates as applied to trapezoidal and corrugated sheets.

Figure 3:
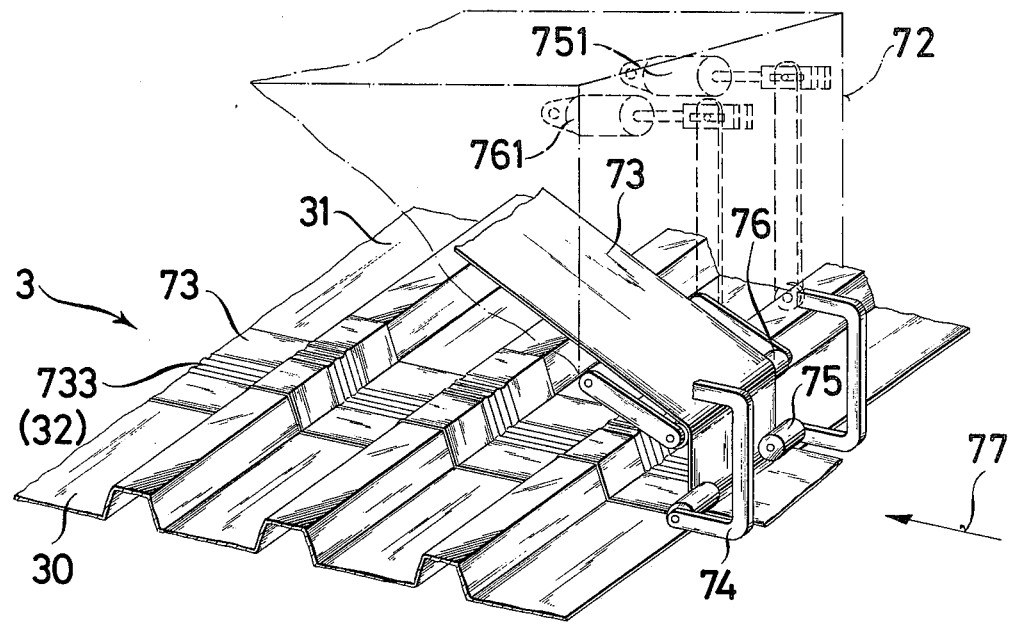

FIG. 3 diagrammatically illustrates the taping in a direction transverse to the longitudinal direction of the plates, and more specifically first when applying the tape and subsequently after the application of the tape.

Figure 4:
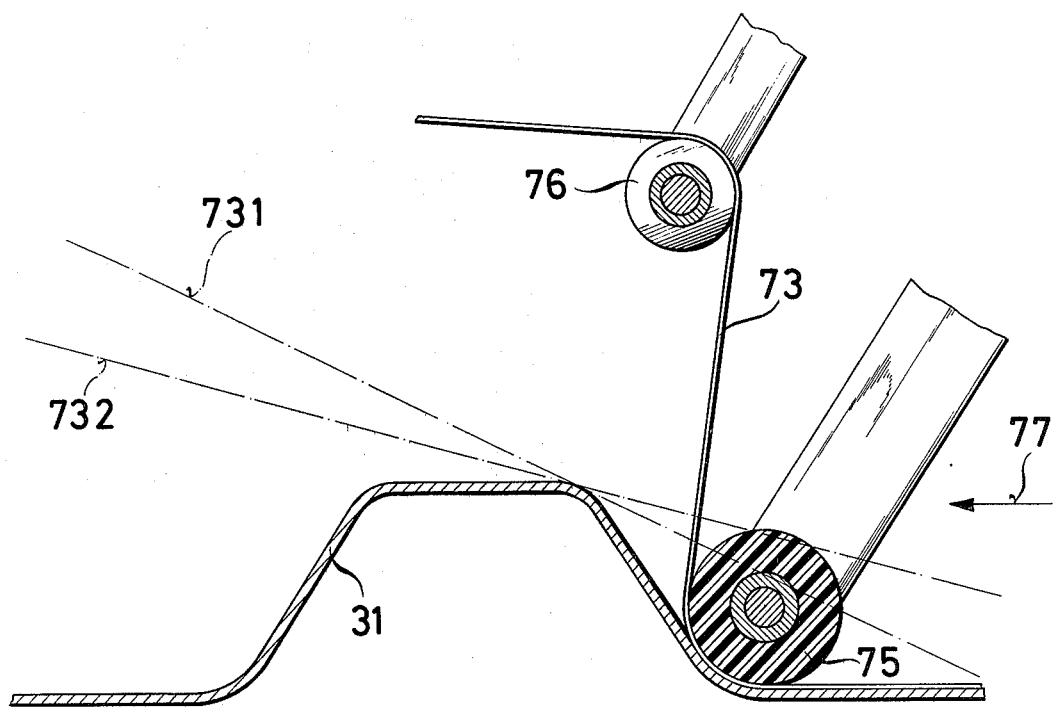

FIG. 4 illustrates the operation of the guiding and pressing rollers.

The present invention is characterized primarily in that that end of one plate and the start of the next following plate are braced relative to each other at a predetermined distance and that the plates relatively fixed in this position are pulled forward together and control a gluing of the butts by means of a tape first in the longitudinal direction of the plates and subsequently tape secondly in a direction transverse thereto. Subsequently, the bracing of the two plates is made ineffective. According to further features of the invention, during the gluing or taping in the transverse direction of the plates, the tape is conveyed to the plate rims in an inclined manner relative to the gluing direction, and the tape rims are independently of each other pressed against the plates.

The device according to the present invention is characterized primarily by a clamping or bracing carriage which is provided with a gap holder including spacer means or members and which is connectable to a longitudinally displaceable transverse gluing slide and is furthermore characterized by a stationarily arranged longitudinal gluing device. The clamping carriage comprises two pairs of claming means between which the gap holder can be lowered and is freely movable to a limited extend in the longitudinal direction so that by the pairs of clamping means respectively associated with a plate, a fixed and safe holding of the plate is assured and the gap holder can adjust itself freely in the longitudinal direction between the two respective plates. The spacer means or members of the gap holder are advantageously exchangeable so that a fast adaptation of the predetermined gap width can be effected in conformity with the respective plates present.

The clamping carriage comprises a latching device, and the transverse gluing slide has a receiving member so that a safe disengageable connection of the clamping carriage with the transverse gluing slide is assured. The stationary longitudinal gluing device is expediently provided with two or more automatically working gluing heads principally known per se which are adjustable in transverse direction.

The transverse gluing slide comprises a gluing head principally known per se which head is provided with two separately effective articulated pressing rollers for safely pressing on the two tape edges while a different plate rim profile exists and is furthermore provided with an articulated guiding roller for guiding the tape.

Referring now to the drawings in detail, the upper cover layer 2 and the lower cover layer 3 composed of trapezoidal or corrugated sheets 30, 31 are conveyed to a double plate band or conveyor 1 to which layers the foamed material is applied from the foaming device 4. The trapezoidal or corrugated sheet 30 successively passes through the clamping carriage 5, the longitudinal gluing device 6, and the transverse gluing slide 7. After the end of the trapezoidal sheet has passed over the first clamping pair 51 and the space holder or spacer means 52, the second clamping pair 53 is braced or clamped with the sheet end. Subsequently, the spacers 521 are moved upwardly above the trapezoidal sheet 30. The start of the next following trapezoidal sheet 31 passes through the clamping pair 51 and inasmuch as the space holder or spacer means 52 is in the longitudinal direction freely displaceable, within limits, the start of the last mentioned trapezoidal sheet 31 brings about an engagement between said spacer members 521 and that end of the first trapezoidal sheet 30 which is already clamped by the clamping pair 53. The width of the gap 32 is dimensioned in conformity with the lack of precision of the profiles and according to the invention may amount to half the height of the profiles. After the start of the next following trapezoidal sheet 31 has been clamped by the clamping pair 51, the spacer members 521 are lowered so that the trapezoidal sheets 30, 31 will be spaced from each other precisely by the thickness of the spacer members 521 and are fixed as to their relative position by being clamped by the clamping pairs 51, 53.

The thus interconnected trapezoidal sheets 30, 31 are together with the clamping carriage 5 pulled in transporting direction or arrow 8 by the double conveyor belt 1 over the start of the trapezoidal sheet 30 which has moved into said double plate belt 1 and has been covered with foamed material. After passing by a predetermined stroke between said double belt 1, the automatically working glue heads 61 of the stationarily longitudinal gluing device 6 are controlled by contacts. These gluing heads 61 press the tapes 610 successively against the rims of the trapezoidal sheets 30, 31 and subsequently separate the same (FIG. 2).

During the further course of the operation, the latching device 54 comes into engagement with the receiving part 71. The transverse gluing slide 7 is now likewise taken along at the transporting speed of the double plate belt 1 and the automatically working glue head 72 is controlled by contacts. After placing the tape 73 upon the rim of the trapezoidal sheets 30 and 31, the individually operable articulated pressing rollers 74 and 75 are respectively by cylinders pressed against the respective sheet rim (FIG. 3). For the sake of simplicity, only the cylinder 751 for the roller 75 is shown.

Thereupon, the articulated guiding roller 76 is actuated by the cylinder 761 so that the tape 73 will be inclined relative to the gluing direction of arrow 77 and relative to the pressing rollers 74, 75. As a result thereof, these rollers are automatically continuously along the respective extension of the profile. Furthermore, in this way an undesired premature sticking of the tape 73 to preceding profile sections due to otherwise customary tape directions 731, 732 which change for instance by a reducing diameter of the tape roll, will be safely avoided (FIG. 4). Within the region of the gap 32 formed by spacer members 521, the tape 73 forms a crumpling 733 within which for equalization of the irregular profile shapes of the rims of the trapezoidal plates 30, 31, folds or the like can form without affecting the seal or tightness of the tape rims tightly resting thereon. After separating the tape 73, guiding rollers 76, pressing rollers 74, 75 and glue head 72 are removed to their starting position. The clamping by the clamping pairs 51, 53 is disengaged so that the lower cover layer 3 formed of trapezoidal sheets 30, 31 and connected through the intervention of tapes 610 and 73 can unimpededly be pulled farther by the double plate belt 1.

Through the intervention of a non-illustrated chain drive, the clamping carriage 5 is moved back in the direction toward its starting position while said carriage through the latching device 54 takes along the transverse gluing slide 7 until its starting position has been reached where the latching device 54 disengages the receiving part 71. After the clamping carriage 5 which then is moved on alone has reached its starting position, the device is ready for a new working cycle, i.e., for connecting a new non-illustrated trapezoidal sheet to the end of the trapezoidal sheet 31 which is already connected to the trapezoidal sheet 30. After the non-illustrated compound element has left the double plate belt 1, the connecting areas of the plates are separated while for purposes of controlling a saw, the gap 32 may be employed as marking.

As will be evident from the above, due to the present invention, the naturally present irregularities of the profiled plates to be interconnected are equalized to a major extent at their end faces. Due to the predetermined distance to be selected in particular in conformity with the height of the profile or to the degree of non-uniformity of the respective plates, as mentioned above a crumpling zone is formed for the tape within which crumpling zone the tape can adapt and deform itself while due to the said distance, sharp merging zones (for instance 90° with the distance zero) will be avoided with differences in the profiles, so that the tape will more softly and more closely engage the two plate rims. Due to the clamping or bracing of the two plate rims up to the final gluing and the control of the gluing in the longitudinal direction of the plate and in the direction transverse thereto by means of the clamped plates, a precise holding of the rims and an automatic synchronous movement will be assured in a simple manner. The longitudinal gluing later relieves the transverse gluing of pulling and shearing forces and thus aids the tightness of the transverse gluing. The tightness of said transverse gluing is aided furthermore by the fact that the glued tape can be applied without, due to the clamping, other forces acting upon said glue strip for instance by an asynchronous movement or play of the driving parts.

Due to the fact that the transverse gluing the glue strip is fed to the plate rims at an inclination relative to the gluing device, a safe following along the extension of the profile and a previous sticking to a preceding profiled section is avoided, whereas the independent pressing of the two tape rims takes into consideration the different contour of the two plate rims.

Due to the device according to the present invention, in a relatively simple manner, an operation safe seal of the abutment gap will be assured also with longitudinally provided profiled plates which differ from each other in cross section, and this will be assured in spite of the high requirement to be met.

It is, of course, to be understood that the present invention is, by no means, limited to the specific showing in the drawings but also comprises any modifications within the scope of the appended claims.

What I claim is:

1. A device for interconnecting longitudinally profiled plates to be covered by foamed material to form a continuous cover layer, which includes in combination a clamping carriage displaceable along a desired path of movement of the plates to be interconnected, said path being substantially parallel to the longitudinal extension of said plates to be interconnected, clamping means forming part of said clamping carriage and movable toward and away from each other and arrestable relative to each other for receiving and clamping therein one end of one longitudinally profiled plate and the start of the next following longitudinally profiled plate, spacer means forming part of said clamping carriage and operable to move between two successive serially arranged plates to space the same from each other, first adhesive tape applying means spaced from said clamping carriage in the direction in which said carriage is movable along said path, said first adhesive tape applying means being operable to apply adhesive tape means to respective adjacent successive plates in a direction only transverse to said path and along the spacing between the respective two successive plates, and second adhesive tape applying means arranged between and in spaced relationship to both said clamping carriage and said first adhesive tape applying means and operable to apply adhesive tape means to successive plates only in the path longitudinal direction thereof and across the spacing therebetween.

2. A device in combination according to claim 1, in which said clamping carriage includes two pairs of clamping means, said spacer means being vertically insertable between said two pairs of clamping means while being adjustable in a direction transverse to said last mentioned movement.

3. A device in combination according to claim 1, in which said spacer means has two exchangeable spacer elements.

4. A device in combination according to claim 1, in which said clamping carriage includes a locking device, and in which said first adhesive tape applying means includes means for cooperation with said locking device.

5. A device in combination according to claim 1, in which said second adhesive tape applying means includes at least two automatically operating adhesive tape applicators adjustable in a direction transverse to the direction of movement of said clamping carriage.

6. A device in combination according to claim 1, in which said first adhesive tape applying means includes an automatically operating adhesive tape applicator comprising two separately effective articulated pressing rollers and an articulated guiding roller.

* * * * *